Feb. 14, 1967 H. E. THOMASON 3,303,838
SOLAR HEAT COLLECTOR
Original Filed March 31, 1961
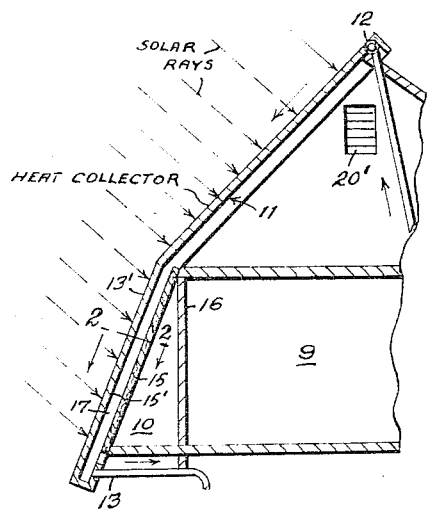
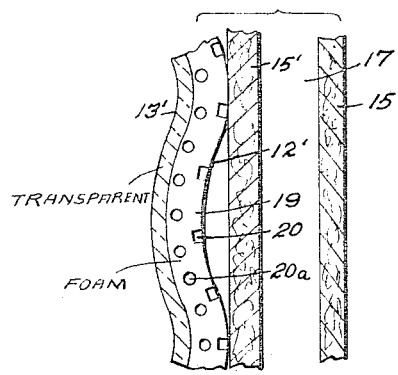
INVENTOR
Harry E. Thomason

United States Patent Office 3,303,838
Patented Feb. 14, 1967

3,303,838
SOLAR HEAT COLLECTOR
Harry E. Thomason, District Heights, Md.
(7354 Walker Mill Road SE., Washington, D.C. 20027)
Original application Mar. 31, 1961, Ser. No. 108,227, now Patent No. 3,254,703, dated June 7, 1966. Divided and this application Oct. 22, 1965, Ser. No. 501,956
5 Claims. (Cl. 126—271)

This is a division of application Serial No. 108,227, filed March 31, 1961, now Patent No. 3,254,703.

The present invention relates to a solar heat collector and more particularly to insulating glazing material therefor with means to remove the heat so collected.

FIG. 1 is a diagrammatic cross section through a solar heat collector installed on a house embodying the present invention.

FIG. 2 is an enlarged view on line 2—2 of FIG. 1.

As illustrated in FIG. 1 the solar house may have living quarters 9, closet area 10 and a solar heat collector 11. The closet area has walls 15, 16, with both preferably being insulated. A louver 20' permits escape of heated air from the attic.

The heat collector 11 preferably has a base sheet 12' adjacent to insulation 15'. "Chimneys" 17, between insulation 15' and 15, remove excessive heat from the heat collector thus avoiding overheating of adjacent living or closet area 9, 10 on hot sunny days.

Water is pumped to the top of solar heat collector 11, is distributed by sparge pipe 12, and is heated as it flows to the bottom, and out at 13.

The specific form of the invention illustrated in detail in FIG. 2 has a layer 19 which may be a heat collecting porous layer of material having perforations or passages 20, 20a. Layer 19 is preferably attached to an inner base layer of material 12' which is substantially impervious to a fluid being circulated through the collector and preferably has an external layer of material 13' which is transparent or reasonably transparent to admit solar energy to or through the material 19. Material 19 may be darkened to absorb solar energy and to thereby heat fluid passing thereinto or therethrough via perforations or passages 20 or 20a. However the material may be transparent or translucent to let solar energy penetrate to inner layer 12' where it heats said inner layer and fluid coming in contact therewith. The porous material may be of a desired thickness of a suitable material such as a porous metallic foam-like material, or plastic, or such, or may be one or more layers of a mesh-like material. Such material may be treated with dyes or other substances within the porous material itself or may be provided with coatings to render the material dark and more heat-arsorbing. Alternatively, the material may be semi-darkened so as to become heated itself or may be transparent or translucent to admit solar energy to the inner surface 12', which inner surface may be darkened to collect solar energy to heat a fluid being circulated through the heat collector. Fluid passages 20 are preferably adjacent the heat collecting surface 12' such as by being embedded in the material 19. Some materials are porous enough for fluid flow therethrough without additional passages. Fluid may be circulated through passages 20 only, or through passages 20a only, or through both. Passages similar to those at 20a are found at random in some foam-like preparations. Although the foam-like and transparent layers are illustrated as being applied to a corrugated base 12' the base may take other forms or shapes as desired, including planar.

I claim:

1. In a solar heat collector, a base which is resistant to fluid flow therethrough, a layer of foam-like material superimposed thereon and having passages therethrough adjacent to said base for the passage of fluid to be heated, and a transparent cover thereover for admitting solar energy to said layer and base and for minimizing heat losses therefrom so as to heat fluid passing through the heat collector, said layer of material being transparent or translucent to permit much of the solar energy to pass to said base, and said base being darkened to intercept the solar energy and to heat the fluid flowing through the heat collector.

2. In a solar heat collector, a base which is resistant to fluid flow therethrough, a layer of foam-like material superimposed thereon and having passages therethrough for the passage of fluid to be heated, and a transparent cover thereover for admitting solar energy to said layer and base and for minimizing heat losses therefrom so as to heat fluid passing through the heat collector, said layer of material being at least partially darkened to intercept some of the solar energy passing thereinto and to thereby heat the fluid flowing therethrough.

3. A solar heat collector comprising a solar heat collecting sheet which, upon being exposed to solar radiations, will absorb said radiations and convert them into sensible heat, glazing material for said solar heat collector comprising a foam-like insulating material exposed to solar radiations passing to said solar heat collecting sheet, said foam-like insulating material being at least partially transparent to transmit a substantial portion of the solar radiations and being insulating in character to minimize loss of heat from said heat collecting sheet.

4. Apparatus as set forth in claim 3 wherein said foam-like insulating material is partially darkened so as to absorb a portion of the solar radiations passing thereinto to generate heat inside of said foam-like insulating material.

5. Solar heat collector glazing comprising solar energy transmitting cellular material of substantial thickness, a solar heat collecting sheet covered by said cellular material, a substantially transparent solar energy transmitting covering sheet of homogeneous material of relatively thin proportions superimposed on said cellular material, said covering sheet being on the side of said cellular material opposite from said heat collecting sheet, said cellular material and covering sheet transmitting relatively large percentages of solar energy to said solar heat collecting sheet but blocking passage of relatively large percentages of infra-red heat energy from the solar heat collecting sheet.

References Cited by the Examiner
UNITED STATES PATENTS

| | | | |
|---|---|---|---|
| 201,439 | 3/1878 | Moreau | 126—270 |
| 2,427,262 | 9/1947 | Delano. | |
| 2,601,905 | 7/1952 | Anderegg | 126—270 X |
| 2,998,005 | 8/1961 | Johnston | 126—270 |
| 2,998,006 | 8/1961 | Johnston | 126—271 |
| 3,102,532 | 9/1963 | Shoemaker | 126—270 |
| 3,124,639 | 3/1964 | Kahn | 88—65 |

CHARLES J. MYHRE, *Primary Examiner.*